United States Patent

Merchant

[15] 3,663,098
[45] May 16, 1972

[54] AUTOMATIC FOCUSING FOR OCULOMETERS

[72] Inventor: John Merchant, Needham, Mass.
[73] Assignee: Honeywell Inc., Minneapolis, Minn.
[22] Filed: Jan. 11, 1971
[21] Appl. No.: 105,525

[52] U.S. Cl. ........................351/6, 250/201, 250/237, 351/16
[51] Int. Cl. ................A61b 3/10, G01j 1/00, H01j 3/14
[58] Field of Search .................351/6, 16; 250/201, 237; 356/122

[56] References Cited

UNITED STATES PATENTS 3,555,280  1/1971  Richards, Jr. et al. ................250/201

*Primary Examiner*—David Schonberg
*Assistant Examiner*—Paul A. Sacher
*Attorney*—Charles J. Ungemach and George W. Field

[57] ABSTRACT

An automatic focusing apparatus for oculometers wherein a reflected corneal image is projected by a lens through an aperture of non-circular outline onto a detector. The detector circularly scans the periphery of the projected image and produces an output indicative of the magnitude and sense of an out of focus condition. The detector output is combined with a lens position signal and a lens position rate signal and controls a servo to position the lens so that a focused condition is achieved and maintained.

10 Claims, 3 Drawing Figures

3,663,098

AUTOMATIC FOCUSING FOR OCULOMETERS

BACKGROUND OF THE INVENTION

This invention relates to the field of optical instruments and more particularly presents an oculometer automatic focusing technique.

The oculometer is an instrument which illuminates the eyeball of an observer and gives a signal determined by the location of a reflection of the illuminating source relative to the pupil of the eye. This signal is found to be reliably representative of the observer's line of sight regardless of lateral or rotational movement of his head within the useful range of the instrument.

Much of the resolution of an oculometer is lost if the reflected image is not in focus, that is, if the observer's eye is not at the proper distance from the collection lens of the oculometer. This problem is especially serious when the observer's head is free to move toward and away from the oculometer or where different observers use the apparatus from time to time. It is therefore desirable to provide an automatic focusing system which operates to both initially focus the oculometer and then continually maintain focus as the observer's head moves axially relative to the apparatus.

BRIEF SUMMARY OF THE INVENTION

In the present invention a reflected corneal image of a radiant source passes through a collection lens to be projected onto a detector. The corneal image is projected through a diaphragm defining an aperture of non-circular outline. The detector circularly scans the periphery of the projected image and produces an output instantaneously representative of the intensity of illumination of the image element being scanned. When the optical system is focused, the projected image is circular and the scanning detector produces a constant output indicative of the uniform illumination thereupon; when the projected image is not focused, the image falling on the detector is shaped by the diaphragm and the detector output accordingly varies as the detector scans the image. The varying component of the detector output is used to position the collection lens so that uniform illumination obtains, thereby achieving and maintaining a focused condition.

DESCRIPTION OF THE PREFERRED EMBODIMENT

Figure 1:
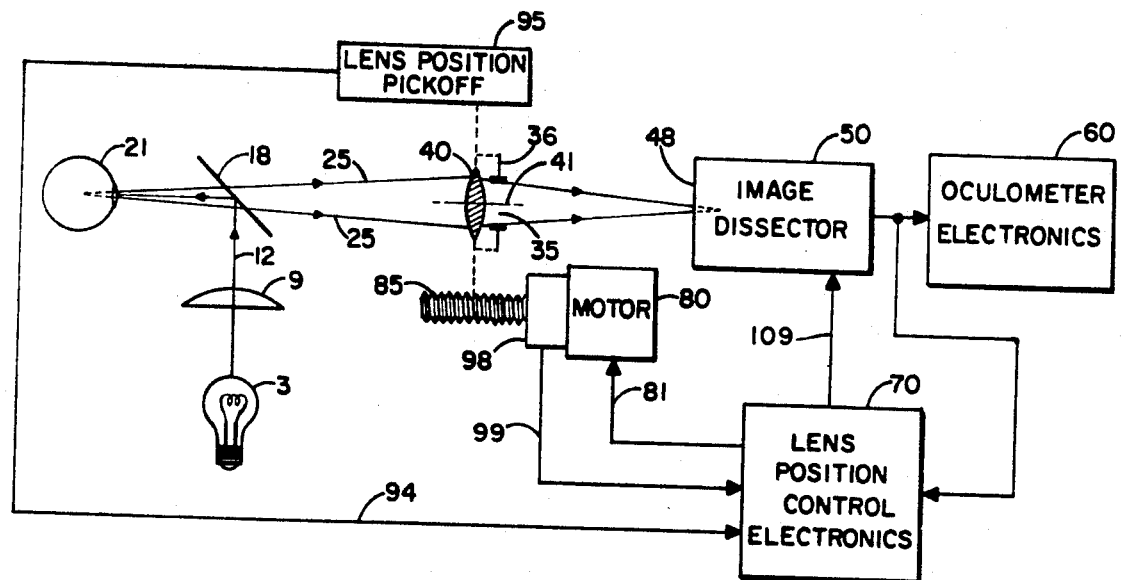
FIG. 1 is a schematic illustration of the preferred embodiment of my automatic focusing apparatus.

The preferred embodiment operates to detect the magnitude and sense of the instantaneous departure of the optical system from a condition in which a corneal reflection of a radiant source is focused on a detector, to produce an out of focus signal. The position of a lens is then controlled by this out of focus signal. Referring to FIG. 1, a lamp 3 and a lens 9 cooperate to provide a nearly point source light beam 12. Light beam 12 is reflected off a beam splitter 18, impinging on the convex eye 21 of the observer. Diverging rays 25 are reflected back through beam splitter 18, a lens 40, and an aperture 35 defined by a diaphragm 36 to be focused by lens 40 on the photosensitive surface 48 of a conventional image dissector 50. Aperture 35 is critically shaped; its features will be discussed subsequently.

The output from image dissector 50 is presented to the oculometer electronics 60, and also to the lens position control electronics 70, which derives an out of focus signal of magnitude and sense of the instantaneous out of focus condition, as is explained subsequently with reference to FIG. 3. The output of the lens position control electronics 70 is in turn presented to a motor 80 that drives a conventional worm gear 85 to which lens 40 and diaphragm 36 are attached. The motor 80 and worm gear 85 cooperate to move lens 40 and diaphragm 36 in either direction along the axis 41 of lens 40 according to the signal presented to motor 80 by the lens position control electronics 70 through a lead 81.

In addition to the magnitude and sense of the out of focus condition, two further parameters are sensed to stabilize and generally improve the performance of the servosystem. First, a lens position pickoff 95, which may for example be a conventional linear variable differential transformer and appropriate energy source, continually provides a lens position feedback signal through a lead 94, to the lens position control electronics 70. A conventional tachometer 98 provides a motor rate signal. by way of a lead 99 to the lens position control electronics 70. The lens position control electronics 70 combines the out of focus signal, the rate signal, and the lens position signal to produce a motor drive signal of appropriate sense and magnitude to position lens 40 along its axis 41 so as to obtain a focused image of the reflection from the cornea of the observer's eye 21 on the photosensitive surface 48 of image dissector 50, whereupon the out of focus signal becomes zero.

Figure 2:
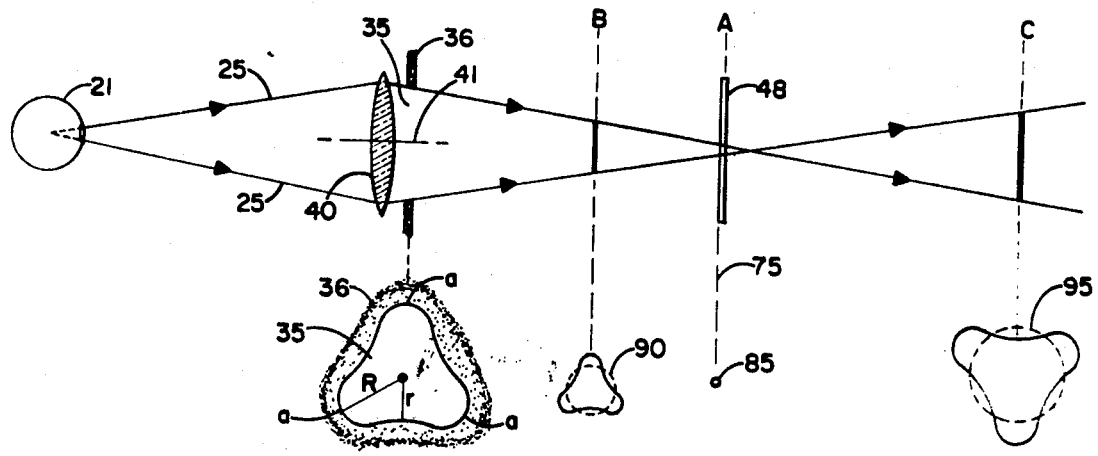
FIG. 2 illustrates the shape of the aperture in the apparatus of FIG. 1, along with the image shapes corresponding to various focus conditions.

FIG. 2, in which like numbers indicate elements similar to those of FIG. 1, illustrates the shape of aperture 35 in the apparatus of FIG. 1. Referring to FIG. 2, diverging light rays 25 reflect off the cornea of the observer's eye 21, passing through lens 40 and aperture 35. Aperture 35 has a configuration of a generally circular area of radius $r$ with an odd plurality of radially symmetrical lobes, all designated $a$, having extremities of radius $R > r$; the radius $R$ of the extremities is less than the radius of lens 40. Although the preferred aperture has three lobes 35a, any odd number of lobes would perform satisfactorily. The number of lobes must be odd in order that an inverted image of the defining aperture be distinguishable from an erect image.

Lens 40 focuses the rays 25 at a focal plane 75. When the oculometer is properly focused, focal plane 75 is coincident with the photosensitive surface 48 of image dissector 50. When out of focus, focal plane 75 is either to the right or left of the photosensitive surface 48. The present invention takes advantage of the fact that the focused image of the corneal reflection is circular, while an out of focus image is shaped by diaphragm 36 and is larger than the focused image. The direction of relative displacement between focal plane 75 and photosensitive surface 48, i.e., the sense of the out of focus condition, determines whether the image on photosensitive surface 48 is erect or inverted.

The shapes of the projected image corresponding to various focus conditions are also illustrated in FIG. 2. When photosensitive surface 48 is coincident with focal plane 75, as illustrated in condition A, the projected image is focused as a small circle. As illustrated at condition B, where photosensitive surface 48 lies between lens 40 and focal plane 75, the image falling on the photosensitive surface 48 has the general shape of aperture 35 and is erect; the size of that image is of course determined by the distance between focal plane 75 and photosensitive surface 48. If the apparatus is out of focus in the other sense, as illustrated at condition C, the image falling on photosensitive surface 48 again has the shape of aperture 35. However, because photosensitive surface 48 is now beyond focal plane 75, the image falling on photosensitive surface 48 is inverted. As before, the size of the image falling on photosensitive surface 48 is determined by the magnitude of the out of focus condition.

The magnitude and sense of the out of focus or "disfocus" condition is measured as follows. Image dissector 50 performs a generally circular scan of the image falling on photosensitive surface 48. The radius of this circular scan is controlled, as more fully explained subsequently with reference to FIG. 3, to correspond to the size of the image falling on the photosensitive surface 48. Thus, when the apparatus is focused, as in condition A in FIG. 2, the image dissector 50 scans the circumference 85 of the circular image, in turn producing a constant output indicative of the constant illumination along the scan path.

When the apparatus is out of focus as illustrated in condition B, the image dissector scans a generally circular pattern 90 having radius determined by the size of the scanned image, which is, as explained, indicative of the degree of disfocus. In performing this scan, the image dissector 50 produces an output only when the scan passes a lobe 35A; no illumination is sensed through other portions of the scan. The output of image dissector 50 is thus a third harmonic of the circular scan frequency. In a typical configuration, this output is a 3 kHz signal corresponding to the 1 kHz circular scan frequency. When the apparatus is disfocused in the other sense, as in condition C, image dissector 50 again scans a generally circular pattern 95, the radius of which is again determined by the size of the projected image. As before, image dissector 50 produces an output having frequency three times that of the circular scan frequency, and the radius of the circular scan path is indicative of the degree of disfocus.

Because the state of erection or inversion of the image falling on photosensitive surface 48 is dependent on the sense of any out of focus condition, the phase of the image dissector 50 output is indicative of that sense. It is for this reason that aperture 35 must be shaped so that an inverted image is distinguishable from the erect image. For the three lobed defining aperture 35 of FIG. 2, the output of image dissector 50 indicating a particular out of focus condition is shifted 180° from the output indicating disfocus in the opposite sense. Thus, the magnitude of an out of focus condition is measured by monitoring the radius of the image dissector 50 scan path, and the sense of that disfocus is determined by monitoring the phase of the image dissector 50 output.

Figure 3:
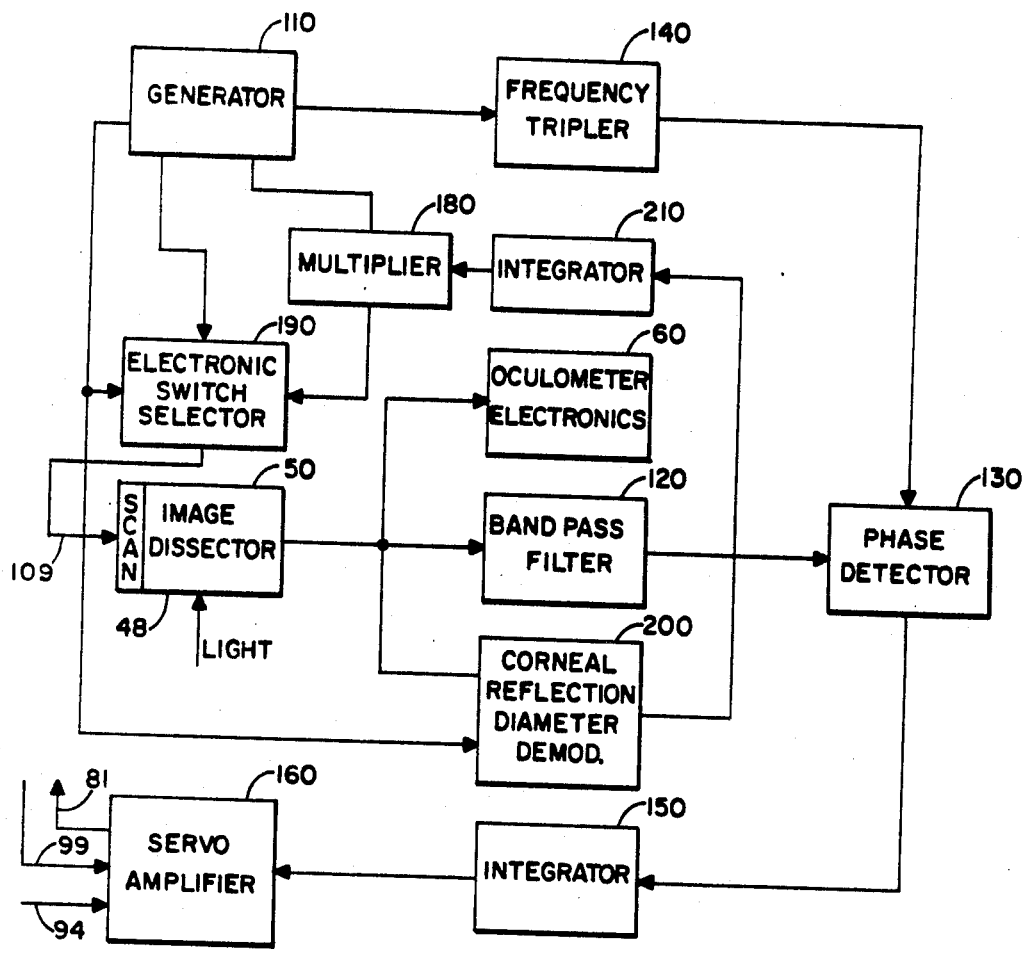
FIG. 3 schematically shows typical electronics as might be employed in the automatic focusing apparatus of FIG. 1.

FIG. 3 illustrates typical electronics employed in the automatic focusing apparatus of FIG. 1. Referring to FIG. 3, a corneal image is projected onto the photosensitive surface 48 of image dissector 50, which circularly scans the projected image according to a scan signal 109 provided by a conventional generator 110. The image dissector 50 is presented to the oculometer electronics 60; the intricacies of oculometer electronics 60 are not pertinent to the present invention and so are not described in detail. The output from image dissector 50 is also presented to a conventional band pass filter 120 which passes any signal in the third harmonic of the circular scan frequency to a phase detector 130.

An output signal from generator 110 is also presented to a frequency tripler 140 which in turn provides to the phase detector 130 a phase reference signal having frequency three times that of the scan signal frequency. Frequency tripler 140 might, for example, be a class C multiplier amplifier as shown in Chance, Hughes, MacNichol, Sayer, and Williams *Waveforms*, Dover Publications, New York 1965, pp.546–548. Other frequency triplers known in the art will also perform satisfactorily in the apparatus.

Phase detector 130 compares the phase reference signal from frequency tripler 140 with the output signal from band pass filter 120 to determine the phase difference between those two signals. As explained previously with reference to FIG. 2, the phase of the image dissector 50 output signal relative to the image dissector scan will be indicative of the sense of a disfocus condition. If the oculometer is disfocused as shown in condition B of FIG. 2, the image dissector 50 output will be in phase with the tripled circular scan frequency. On the other hand, disfocus in the sense shown in condition C of FIG. 2 will cause the image dissector 50 output to be 180° out of phase from the tripled circular scan frequency. When the apparatus is focused, as in condition A in FIG. 2, the image dissector 50 produces a constant output throughout the circular scan. In that situation, no third harmonic of the scan frequency is present in the output from the image dissector 50; band pass filter 120 therefore passes no signal to phase detector 130, and phase detector 130 accordingly produces a null output.

An AC output from filter 120 in response to disfocus results in a DC output from phase detector 130, which is integrated by a conventional integrator 150 before presentation to a conventional servoamplifier 160. Servoamplifier 160 sums the disfocus signal, the lens rate signal from tachometer 98 and the lens position signal from lens position pickoff 95 to determine the magnitude and sense of a lens position command signal presented to motor 80. As explained previously, motor 80 positions the lens in response to this signal to achieve a focus condition.

The scanning signal provided by generator 110 must be controlled to correspond to the radius of the corneal image falling on image dissector 50. With the apparatus of FIG. 3, the corneal circular scan has two different diameters on alternate scans of the image falling on image dissector 50. On odd scans, that is, scans 1, 3, 5, etc., the scan path is a small fixed diameter circle of radius smaller than the radius of the sharply focused corneal reflection image on the photosensitive surface. On even scans 2, 4, 6, etc., the circular scan has a larger diameter controlled by the gain of multiplier 180 acting as a multiplier. These alternating scan paths are selected by an electronic switch selector 190. The resulting corneal video output level from image dissector 50 will then generally be smaller on even scans that on odd scans because the scanned diameter will be larger and the scanning aperture further away from the center of the corneal reflection image. A corneal reflection diameter demodulator 200, which might be an operational amplifier with an FET switch on each input, produces a signal that is zero when the even scan video level is 50 percent of the odd scan video level, positive when the even scan video is greater than 50 percent of the odd scanned video, and negative when the even scanned video is less than 50 percent of the odd scan video level. The output from the corneal diameter demodulator 200 is applied to a conventional integrator 210; the output from the integrator 210 controls the diameter of the even corneal scans so that if the even scan video level is greater than 50 percent of the odd scan video level, the even scan diameter is increased; if the even scan video level is less than 50 percent of the odd video level, the even scan diameter is decreased. In this way the diameter of the even corneal image scan is automatically set so that the even scan video level is 50 percent of the odd scan video level. This maintains an even corneal scan over the edge of the corneal reflection detail, accomplishing the desired result, since such a scan always produces a third harmonic indicative of any focus error.

Those skilled in the art will recognize various applications and modifications within the spirit of the present focusing technique. The technique may be employed in any optical apparatus where it is desired to achieve and maintain the focus of a circular nearly point source image, including astronomical instruments.

As outlined above, the aperture need not have a three-lobed configuration; essentially any noncircular aperture having extremities smaller than the lens radius will perform satisfactorily, so long as an inverted projected image is distinguishable from the erect image. In addition, the aperture may be on either side of the lens, so long as the projected image is limited by the size of the aperture rather than the lens diameter.

For simplicity, this specification has described the image dissector 50 scan path as a circle; in practice the scan path might be epicycloidal, having a small circular scan imposed on a larger circular scan path. In that case the image dissector output would have a component in the third hormonic of the larger circular scan frequency. Otherwise, the operation would parallel that above described. Throughout the specification and claims the term "circularly scan" encompasses both a simple circular and a cycloidal scan path.

I claim as my invention:

1. Automatic focusing apparatus comprising:

means for providing a beam of light of circular section;

detector means having a photosensitive surface, the detector means being operable to circularly scan an image projected on the photosensitive surface and produce an output instantaneously indicative of the intensity of the image element being scanned;

a lens positioned so that the beam of light is projected by the lens to form an image on the photosensitive surface of the detector means;

a diaphragm between the lens and the detector means, proximate the lens, the diaphragm defining an aperture having a configuration of a generally circular central area with an odd number of outwardly directed radially symmetrical lobes of radius less than the radius of the lens, so that when the image is not focused on the surface it has the outline of the aperture;

motor means for axially moving the lens and the diaphragm together in response to a command signal; and control means operably connected between the detector means and motor means to provide a command signal to the motor means to position the lens and diaphragm so as to achieve a circular image on the photosensitive surface of the detector means.

2. The apparatus of claim 1 further including:

means for providing a signal indicating the position of the lens along its axis; and means for providing a signal indicating the rate of motion of the lens along the axis; and wherein the control means is operable to combine the detector means output, the lens position signal and the rate signal to provide the command signal to the motor means.

3. In an oculometer, apparatus according to claim 1 wherein the means for providing a beam of light of circular section comprises an essentially point source of light and means for directing a light beam from the point source to the cornea of an observer's eye, a reflection from the cornea being a beam of light of circular section.

4. Apparatus according to claim 1 wherein the control means includes means responsive to the amplitude and phase of a signal component the frequency of which is an odd multiple of the circular scan frequency equal to the number of the outwardly directed lobes.

5. In an optical instrument wherein a light beam of circular section must be focused, automatic focusing apparatus comprising:

detector means having a photosensitive surface, the detector means being operable to circularly scan an image projected on the photosensitive surface and produce an output instantaneously indicative of the intensity of the image element being scanned;

means for projecting the light beam onto the photosensitive surface of the detector means;

diaphragm means defining an aperture having a configuration of a generally circular central area with an odd number of outwardly directed radially symmetrical lobes, the diaphragm means being between the light beam source and the photosensitive surface of the detector means so that the projected light beam passes through the diaphragm means;

motor means for axially moving the photosensitive surface of the detector means in response to a command signal; and control means between the detector means and the motor means for providing a command signal to the motor means to position the photosensitive surface of the detector means to achieve a continuous output from the detector means indicative of uniform illumination along the detector means circular scan path.

6. Automatic focusing apparatus operative to focus a beam of light of circular section comprising:

diaphragm means defining an aperture having a configuration of a generally circular central area with an odd number of outwardly directed radially symmetrical lobes;

detector means having a photosensitive surface, the detector means being operable to circularly scan an image projected on the photosensitive surface and produce an output instantaneously indicative of the intensity of the image element being scanned;

means for directing the beam of light of circular section through the diaphragm onto the photosensitive surface of the detector means so that the beam is shaped by the aperture;

a lens in the path of the beam of light;

motor means for moving the lens in response to a command signal; and control means operably connected to the detector means for providing a command signal to the motor means of sense and magnitude to position the lens so as to obtain an image of circular section on the photosensitive surface of the detector means, the image of circular section on the photosensitive surface of the detector means being indicated by a constant output from the detector means throughout the circular scan.

7. The apparatus of claim 6 wherein the detector means includes means for circularly scanning the projected image on the photosensitive surface at a constant scan frequency, and the control means includes means for detecting amplitude of that circular scan as a measure of the degree of a disfocus condition and further detecting the phase of the detector means output to determine the sense of the disfocus.

8. The apparatus of claim 7 wherein the aperture defined by the diaphragm has three lobes, resulting in detector means output signal in the third harmonic of the constant circular scan frequency of the detector means.

9. The apparatus of claim 6 wherein the detector means circular scan has an amplitude smaller than the radius of the focused image of the beam of light on the photosensitive surface of the detector means on odd numbered scans and on even numbered scans the detector means determines and maintains the circular scan radius producing an output level of fixed relation to that produced on odd numbered scans.

10. The apparatus of claim 9 wherein the even scan detector means output level is determined and maintained to be 50 percent of the odd scan detector means output level.

* * * * *